United States Patent
Hsieh et al.

(10) Patent No.: US 7,616,614 B2
(45) Date of Patent: Nov. 10, 2009

(54) ADAPTIVE COMMUNICATION METHOD AND MODULE EMPLOYING DIFFERENT LAYERS FOR DIFFERENT PROTOCOLS

(75) Inventors: Chih-Chiang Hsieh, Kaohsiung County (TW); Heng-Iang Hsu, Taipei (TW)

(73) Assignee: Institute for Information Industry, Taipei (TW)

( * ) Notice: Subject to any disclaimer, the term of this patent is extended or adjusted under 35 U.S.C. 154(b) by 683 days.

(21) Appl. No.: 11/313,839

(22) Filed: Dec. 22, 2005

(65) Prior Publication Data

US 2007/0091924 A1    Apr. 26, 2007

(30) Foreign Application Priority Data

Oct. 21, 2005    (TW) .............................. 94136863 A

(51) Int. Cl.
*H04W 4/00*    (2009.01)

(52) U.S. Cl. .................. 370/338; 370/282; 370/310; 370/328; 370/474; 455/436; 455/450

(58) Field of Classification Search .............. 370/282, 370/310, 328, 338, 474; 455/436, 450
See application file for complete search history.

(56) References Cited

U.S. PATENT DOCUMENTS

| | | | |
|---|---|---|---|
| 6,363,058 B1 * | 3/2002 | Roobol et al. ............... | 370/310 |
| 6,477,670 B1 * | 11/2002 | Ahmadvand ............... | 714/712 |
| 6,788,652 B1 * | 9/2004 | Hwang ..................... | 370/282 |
| 7,039,026 B2 * | 5/2006 | Francoeur et al. ........... | 370/328 |
| 2001/0033582 A1 * | 10/2001 | Sarkkinen et al. ........... | 370/474 |

* cited by examiner

*Primary Examiner*—Stephen M D'Agosta
(74) *Attorney, Agent, or Firm*—Birch, Stewart, Kolasch & Birch, LLP

(57) ABSTRACT

Adaptive communication method and apparatus are provided for third generation mobile transmission system (UMTS). A third layer module is provided to dominate transmission resources. A second layer module is provided to perform quality control. A first layer module is provided to perform signal transmission and reception. It is detected whether the first layer module supports a high speed protocol. If the first layer module supports the high speed protocol, the high speed protocol is used for transmission. If the first layer module does not support the high speed protocol, a conventional protocol is used for the transmission.

4 Claims, 4 Drawing Sheets

ADAPTIVE COMMUNICATION METHOD AND MODULE EMPLOYING DIFFERENT LAYERS FOR DIFFERENT PROTOCOLS

BACKGROUND OF THE INVENTION

1. Field of the Invention

The invention relates to third generation (3G) terminal communication, and in particular, to a communication method supporting various versions of physical layer modules.

2. Description of the Related Art

Mobile voice and digital communication requirements are increasing in complexity, rendering insufficient transfer rate and bandwidth for current communication systems. A third generation (3G) mobile communication standard provides higher bandwidth utilization and transfer rate. Various 3G systems have been proposed, with a universal mobile transmission system (UMTS) from Europe the most widely adopted standard.

FIG. 1 shows a conventional UMTS architecture, in which three layers are provided to process communication data. A physical layer 114 is implemented by hardware, modulating data with carrier frequency into radio signals for transmission. A second layer is implemented by software, comprising a radio link control (RLC) 110 and a media access control (MAC) 112. The MAC 112 multiplexes transmission data based on commands received from the radio resource control (RRC) 104, mapping packets received over various logical channels 270 from the RLC 110 to corresponding transport channels 280 according to the priority thereof. The MAC 112 also supports wireless resource domination including priority, client identification and throughput measurement.

RLC 110 manages transmission quality control for the UMTS. Packets are divided, transmitted, retransmitted, and combined by the RLC 110 based on corresponding quality level requirements. Four quality levels are defined according to the UMTS, including "conversational", "streaming", "interactive" and "background". The RLC 110 performs flow control, packet reordering, packet encryption and error detection to accomplish the pack division and transmission.

The first layer protocol comprises at least three software implemented logic blocks, radio resource control (RRC) 104, Broadcast/Multicast Control (BMC) 106 and packet data convergence protocol (PDCP) 108. The UMTS provides the PDCP 108 to enhance packet transfer efficiency by compressing packet headers. For example, a voice over IP (VOIP) packet header comprises 40 to 60 bytes, and the data payload comprises only 20 bytes. The header is thus compressed by the PDCP 108 to enhance transfer efficiency. The BMC 106 handles broadcast signals transmitted from the base station, such as message storage and display. The RRC 104 is the kernel of the UMTS, handling wireless resource message exchange, wireless resource configuration, quality control, channel format configuration, packet division and combination control, and non-access stratum (NAS) protocol.

The UMTS in FIG. 1 also comprises a NAS 102 handling user interface protocols. The NAS 102 comprises connection management, mobility management and radio access bearer management (RABM) 204. The NAS in UMTS is inherited from GSM phase 2+. In 3G systems, the NAS 102 is implemented in the mobile terminal and MSC/SGSN stations. The RABM 204 provides configuration and management of the logic channels for packet transmission. The UMTS supports pack transmission of transfer rate and quality, and the logic channels are built, adjusted, maintained, and released by the RABM 204 based on control of the NAS.

During voice communication, an adaptive multi-rate codec (AMR) codec 210 generates control signal 250 (control plane) and data signal 260 (user plane) bound for the remote, and the first, second and third layers convert the control signal 250 and data signal 260 to radio signals for transmission. The RRC 104 individually commands the BMC 106, the PDCP 108, the RLC 110, the MAC 112 and physical layer 114 to build logical channels corresponding to the control signal 250 and data signal 260.

According to the standard, a plurality of logical channels 270 link the RLC 110 and MAC 112, and a plurality of transport channels 280 link the MAC 112 and physical layer 114. The RLC 110 sends various command signals to the MAC 112 via logical channels 270 comprising BCCH, PCCH, CCCH and DDCH. The command signals are then diverted to the physical layer 114 via the transport channels 280. The mapping between the logical channels 270 and transport channels 280 may be one-to-many. The physical layer 114 transmits radio signals after a modulation operation. The physical layer 114 is typically an external module provided by various hardware vendors with protocols thereof differing. For example, if the second layer is implemented by software, consuming significant system resources in processing the data signal 260, the physical layer 114 may be designed to directly receive data signal 260 from the codec 210 without occupation of the second layer. An improved UMTS architecture is desirable to provide compatibility with various specifically designed physical layers 114 in one module.

BRIEF SUMMARY OF INVENTION

A detailed description is given in the following embodiments with reference to the accompanying drawings.

An exemplary embodiment of an adaptive communication method is provided for third generation mobile transmission system (UMTS). A third layer module is provided to dominate transmission resources. A second layer module is provided to perform quality control. A first layer module is provided to perform signal transmission and reception. The first layer module is detected whether supporting a high speed protocol. If the first layer module supports the high speed protocol, the high speed protocol is utilized for transmission. If the first layer module does not support the high speed protocol, a conventional protocol is utilized for the transmission.

The high speed protocol comprises the following steps. The first and second layer modules are configured to build a data channel linking the first layer module and a codec, delivering a data signal without the second layer module. A control channel is built, linking the first, second, third modules and the codec, delivering a control signal. When in a transfer mode, the control signal is passed over the control channel from the codec to the first module, and the data signal is passed over the data channel from the codec to the first layer module. When in a receiving mode, the control signal is passed over the control channel from the first layer module to the codec, and the data signal is passed over the data channel from the first layer module to the codec.

The first layer module is a physical layer implemented by hardware. The second layer module is implemented by software, comprising a RLC and a MAC. The third layer module is implemented by software, comprising a RRC and a NAS. The NAS comprises a RABM. Configuration of the first and second layer module is accomplished by configuration of the RABM, the RLC, the MAC and the physical layer by the RRC, such that the data channel is built by directly linking the RABM with the physical layer.

The building of the control channel comprises the following steps. The RRC configures the RLC, the MAC and the physical layer. A plurality of logic channels are built between the RLC and the MAC. A plurality of transmission channels are built between the MAC and physical layer. The logic channels and the transmission channels are one-to-one or one-to-many associated. The control channel passes through the NAS, the RRC, the logic channels and the transmission channels. The codec is an adaptive multi-rate (AMR) codec or a VOIP module.

An adaptive communication module implementing the method is also provided.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is provided for the purpose of illustrating the general principles of the invention and should not be taken in a limiting sense. The scope of the invention is best determined by reference to the appended claims.

Figure 1:
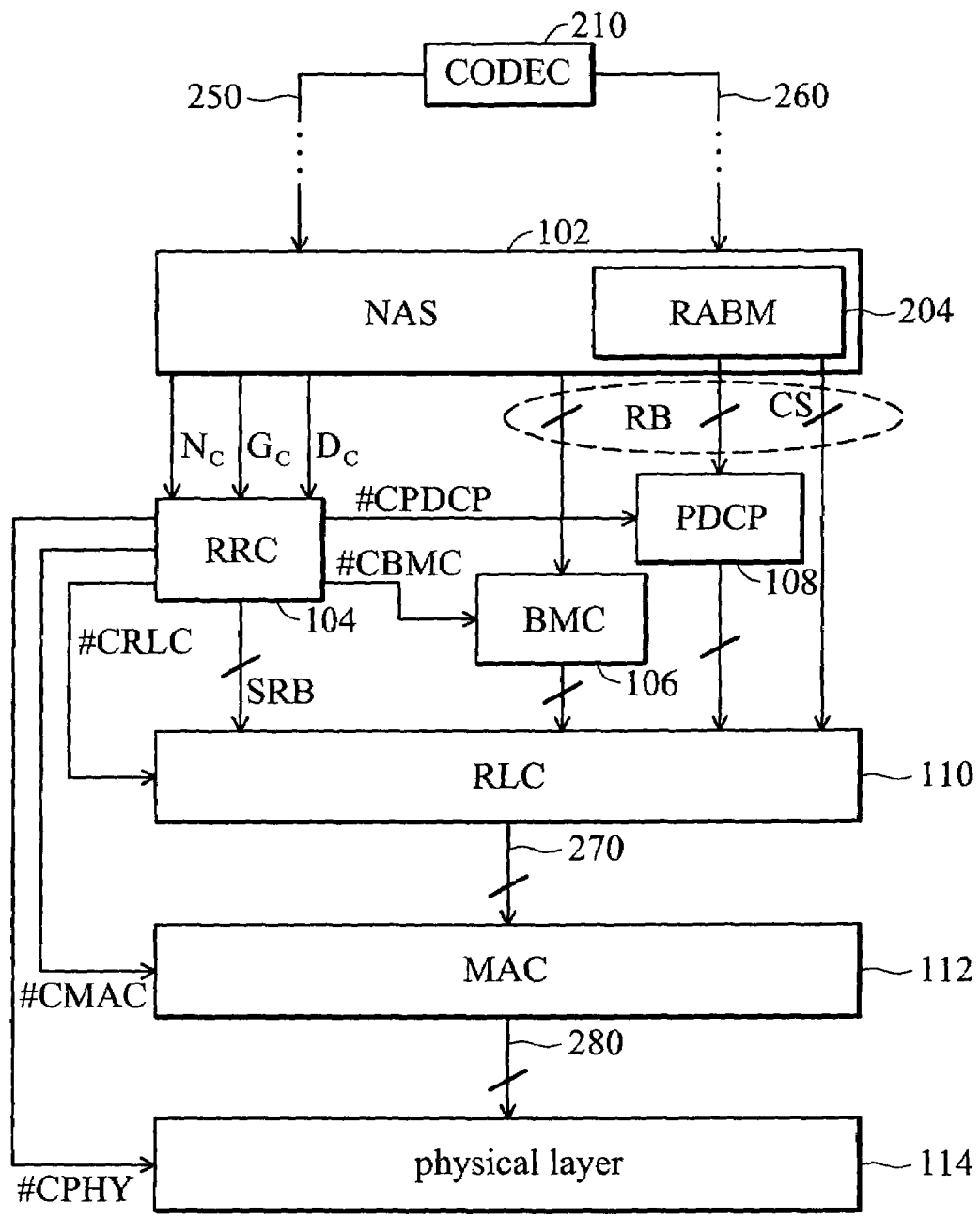
FIG. 1 shows a conventional UMTS architecture.
Figure 2:
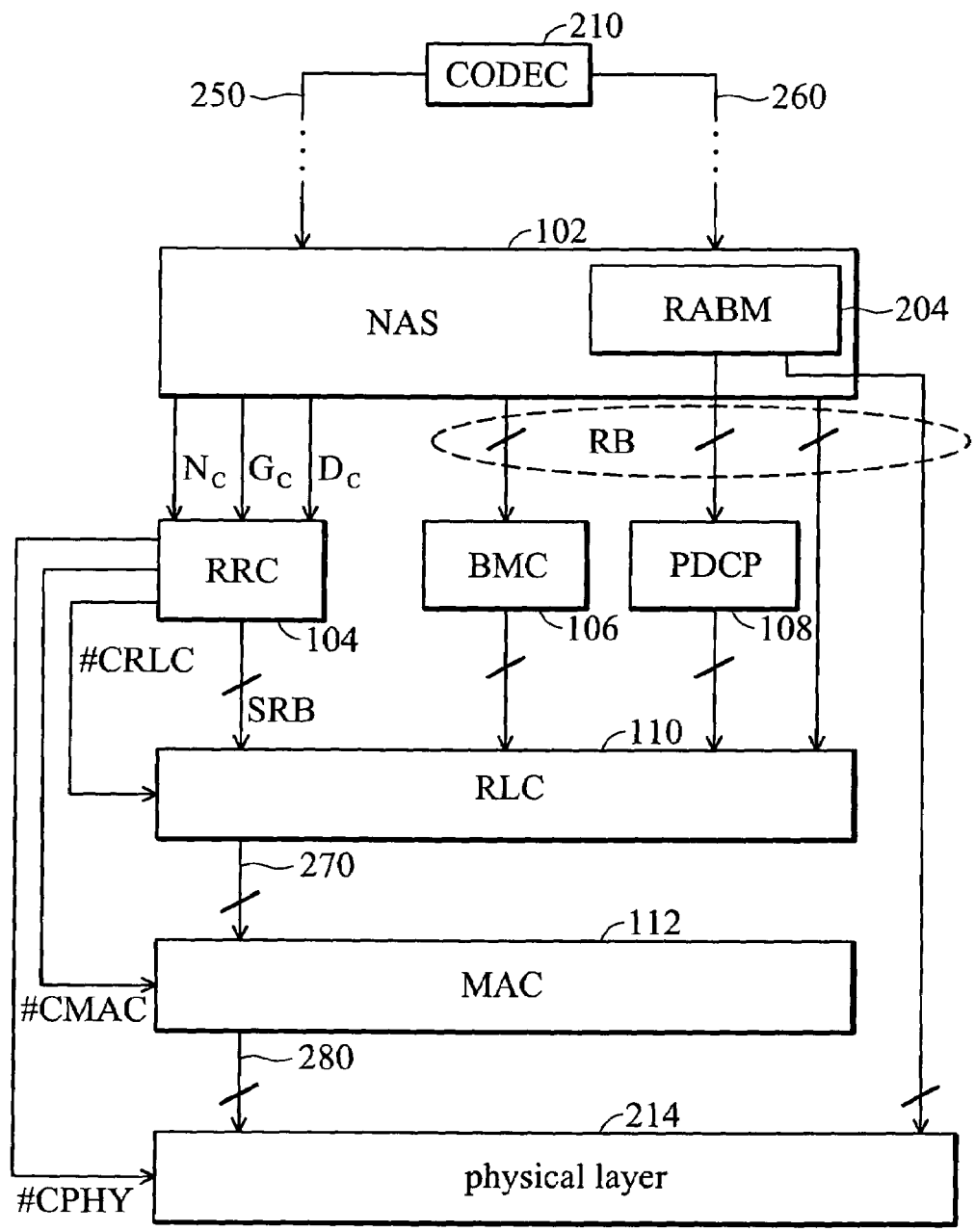
FIG. 2 shows an embodiment of the UMTS architecture according to the invention.

FIG. 2 shows an embodiment of a UMTS architecture according to the invention. The embodiment provides a RRC 104 determining whether a high speed protocol is supported by the physical layer module 214. If the physical layer module 214 does not support the high speed protocol, a conventional protocol is employed. The high speed protocol directly transfers the data signal 260 from codec 210 to physical layer module 214 without use of the second layer module. First, the RRC 104 configures the parameters of the first and second layer modules to build a data channel linking the first layer module and a codec, such that the data signal 260 is delivered via the data channel that bypasses the second layer module. The RRC 104 also builds a control channel linking the first, second and third layer modules and the codec to transfer the control signal 250. When in transmission mode, the control signal 250 is sent to the first layer module from the codec via the control channel, and the data signal 260 is sent to the first layer module from the codec via the data channel. In a receiving mode, the process is reversed. The first layer module is a physical layer 114 implemented by hardware circuits. The second layer is implemented by software, comprising a RLC 110 and a MAC 112. The third layer module is also implemented by software, comprising a RRC 104 and a NAS 102. The NAS 102 comprises a RABM 204. The RRC 104 individually configures parameters in the RABM 204, RLC 110, MAC 112 and physical layer module 214 to build the data channel, and individually configures parameters in the RLC 110, MAC 112 and physical layer module 214 to build the control channel. A plurality of logical channels 270 are built between the RLC 110 and MAC 112, and a plurality of transport channels 280 are provided between the MAC 112 and physical layer module 214. Association between the logical channels 270 and transport channels 280 can be one-to-one or one-to-many. The control channel passes the NAS 102, the RRC 104, the logical channels 270 and transport channels 280. The codec 210 can be an AMR codec or a VOIP module.

Figure 3:
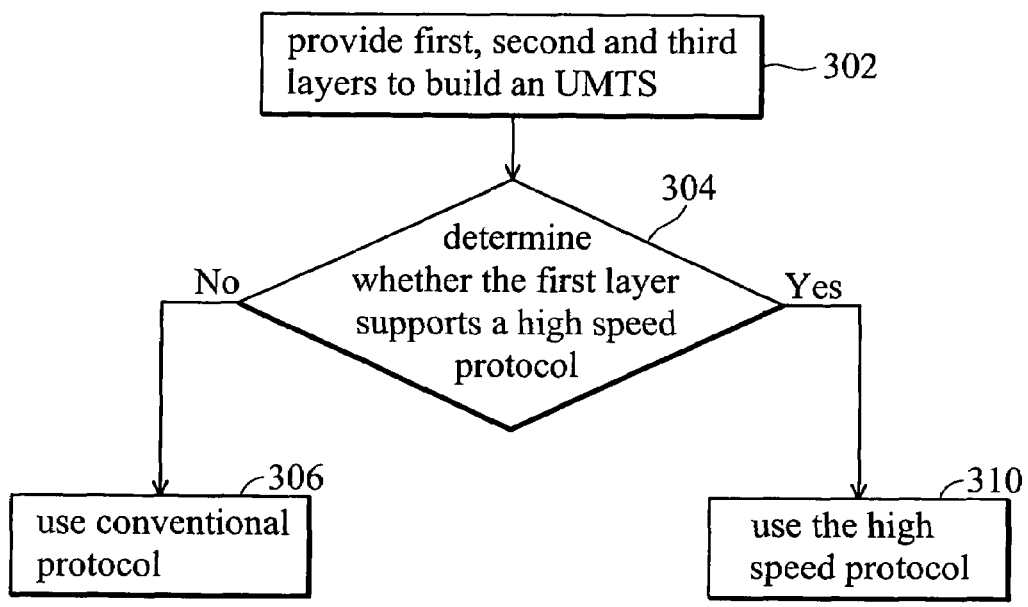
FIG. 3 is a flowchart of the adaptive communication method according to the invention.

FIG. 3 is a flowchart of the adaptive communication method according to the invention. In step 302, a third layer module is provided to dominate transmission resources. A second layer module is provided to execute quality control. A first layer module is provided to perform signal modulation and transmission. In step 304, it is determined whether the first layer module supports a high speed protocol. If so, the process goes to step 310, communicating using the high speed protocol. If not, step 306 is executed, communicating using the conventional protocol.

Figure 4:
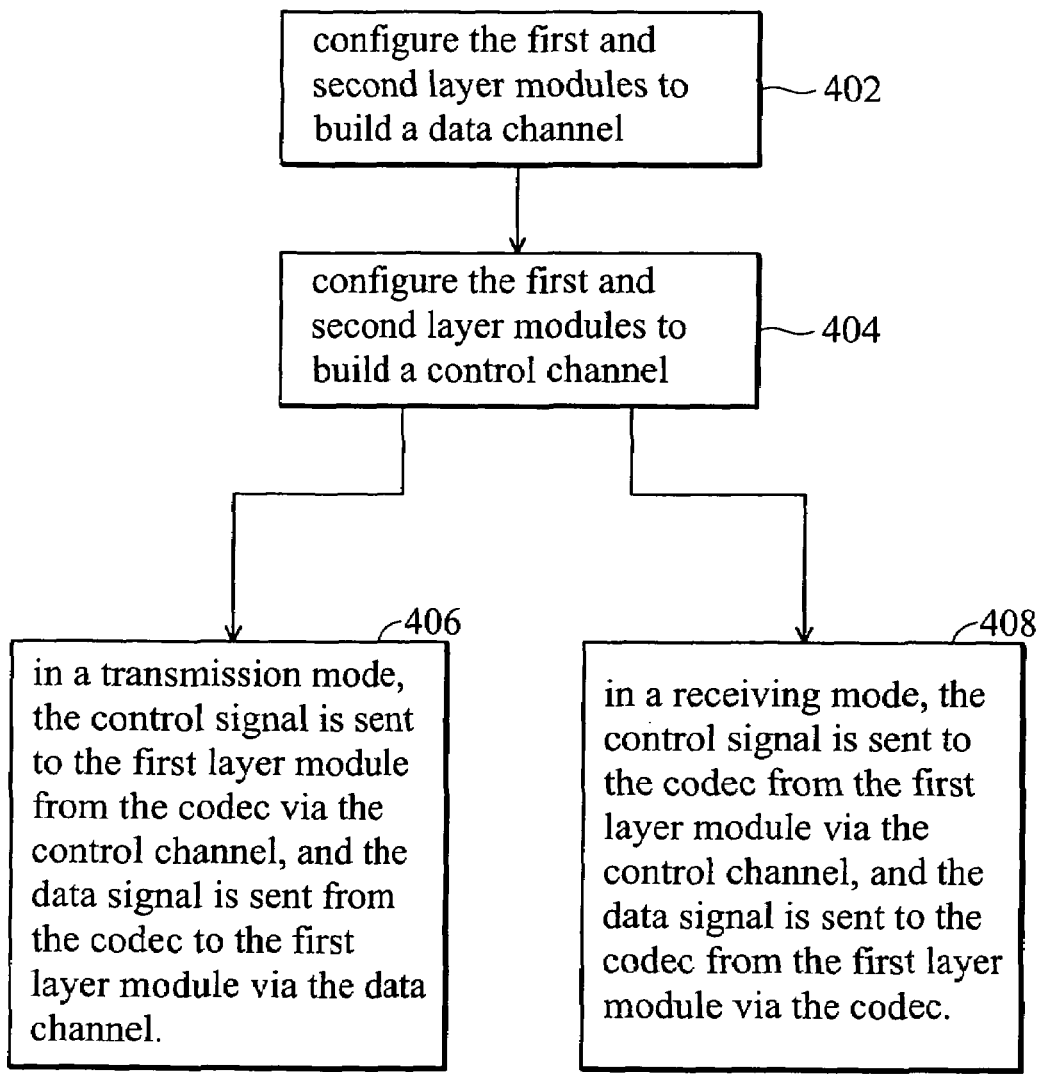
FIG. 4 is a flowchart of the high speed protocol.

FIG. 4 is a flowchart of the high speed protocol. In step 402, parameters in the first and second layer modules are configured to build a data channel linking the first layer module and a codec. Data signals 260 are transferred via the data channel without passing the second layer module. Is step 404, parameters in the first and second layer modules are configured to build a control channel linking the first, second, third layer modules and the codec, and the control signal 250 is transferred thereby. In step 406, the control signal 250 is sent to the first layer module from the codec via the control channel in a transmission mode, and the data signal 260 is sent from the codec to the first layer module via the data channel. In step 408, when in a receiving mode, the control signal 250 is sent to the codec from the first layer module via the control channel, and the data signal 260 is sent to the codec from the first layer module via the codec.

In the UMTS, the communication data is represented as radio bearer (RB). The control signal 250 is a signaling RB (SRB) directly provided by RLC 110, not comprising the PDCP 108 and BMC 106 that provide IP header compression. The RB of data signals 260 (user plane) utilizes the PDCP 108 and BMC 106 according to the arrangement of the RRC 104. Based on the specification of 3GPP standard, the RB is numbered from 0 to 32, in which RB0 to RB4 are SRB, and others are preserved for the RRC to dominate. When the physical layer module 214 supports direct process of data signal 260, the data signal 260 is directly sent to the physical layer module 214 by the RABM 204, and the occupation of the RLC 110 and MAC 112 in the second layer module is eliminated, thus system efficiency is improved.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An adaptive communication method for third generation mobile transmission systems (UMTS), comprising:

providing a third layer module to handle transmission resources;

providing a second layer module to execute quality control;

providing a first layer module to perform signal transmission and reception;

detecting whether the first layer module supports a high speed protocol;

if the first layer module supports the high speed protocol, performing the transmission using the high speed protocol;

if the first layer module does not support the high speed protocol, performing the transmission using a non-UMTS protocol; wherein the high speed protocol comprises the following steps:

configuring the first and second layer modules to build a data channel directly linking the first layer module and a codec, for delivering a data signal without usage of the second layer module;

building a control channel linking the first, second, third modules and the codec, for delivering a control signal;

when in a transfer mode, sending the control signal on the control channel from the codec to the first module, and sending the data signal on the data channel from the codec to the first layer module; and when in a receiving mode, sending the control signal on the control channel from the first layer module to the codec, and sending the data signal on the data channel from the first layer module to the codec, wherein:

the first layer module is a physical layer implemented by hardware;

the second layer module is implemented by software, comprising a radio link control (RLC) and a media access control (MAC);

the third layer module is implemented by software, comprising a radio resource control (RRC) and a non-access stratum (NAS);

the NAS comprises radio access bearer management (RABM); and the configuration of the first and second layer module comprises configuration of the RABM, the RLC, the MAC and the physical layer by the RRC, such that the data channel is built by directly linking the RABM with the physical layer; and wherein building of the control channel comprises:

the RRC configuring the RLC, the MAC and the physical layer;

building a plurality of logic channels between the RLC and the MAC; and building a plurality of transmission channels between the MAC and physical layer, wherein the logic channels and the transmission channels are one-to-one or one-to-many associated, and the control channel passes through the NAS, the RRC, the logic channels and the transmission channels.

2. The adaptive communication method as claimed in claim 1, wherein the codec is an adaptive multi-rate (AMR) codec or a voice over IP (VOIP) module.

3. An adaptive communication module for third generation mobile transmission system, comprising:

a third layer module handling transmission resources;

a second layer module coupled to the third layer module, executing quality control based on control of the third layer module; and a first layer module coupled to the second layer module, performing signal transmission and reception; wherein:

the third layer module detects whether the first layer module supports a high speed protocol;

if the first layer module supports the high speed protocol, the adaptive communication module performs the transmission using the high speed protocol;

if the first layer module does not support the high speed protocol, the adaptive communication module performs the transmission using a non-UMTS protocol;

wherein when the adaptive communication module performs the high speed protocol:

the third layer module configures the first and second layer modules to build a data channel linking the first layer module and a codec, for delivering a data signal without the second layer module;

the third layer module builds a control channel linking the first, second, third modules and the codec, delivering a control signal;

when in a transfer mode, the control signal is sent on the control channel from the codec to the first module, and the data signal is sent on the data channel from the codec to the first layer module; and when in a receiving mode, the control signal is sent on the control channel from the first layer module to the codec, and the data signal is sent on the data channel from the first layer module to the codec, wherein:

the first layer module is a physical layer implemented by hardware;

the second layer module is implemented by software, comprising a RLC and a MAC;

the third layer module is implemented by software, comprising a RRC and a NAS;

the NAS comprises a RABM;

the RRC configures the RABM, the RLC, the MAC and the physical layer, such that the data channel is built by directly linking the RABM with the physical layer; and the RRC configures the RLC, the MAC and the physical layer, such that a plurality of logic channels are built between the RLC and the MAC, and a plurality of transmission channels are built between the MAC and physical layer, wherein the logic channels and the transmission channels are one-to-one or one-to-many associated, and the control channel passes through the NAS, the RRC, the logic channels and the transmission channels.

4. The adaptive communication module as claimed in claim 3, wherein the codec is an adaptive multi-rate codec or a VOIP module.

* * * * *